United States Patent [19]

Picard

[11] Patent Number: 4,807,205
[45] Date of Patent: Feb. 21, 1989

[54] PROCESS FOR WRITING WITH UPDATING AND READING INFORMATIONS ON A NON-ERASABLE SUPPORT ORGANIZED INTO SECTORS

[76] Inventor: Michel Picard, 16 Cours du Buisson, 77420 Noisiel, France

[21] Appl. No.: 935,277

[22] Filed: Nov. 26, 1986

[30] Foreign Application Priority Data

Nov. 29, 1985 [FR] France .................. 85 17670

[51] Int. Cl.[4] ................................. G11B 17/22
[52] U.S. Cl. ........................ 369/32; 369/30; 369/44; 360/72.1; 360/72.2
[58] Field of Search ............... 369/32, 33, 34, 44, 369/45, 100, 58, 59; 360/11.1, 73, 77, 72.2, 70, 72.1; 358/342, 347, 322

[56] References Cited

U.S. PATENT DOCUMENTS

| | | |
|---|---|---|
| 4,142,209 | 2/1979 | Hedlund . |
| 4,307,418 | 12/1981 | Mindel et al. ............ 369/30 |
| 4,375,091 | 2/1983 | Dakin et al. ............ 369/32 |
| 4,506,355 | 3/1985 | Dakin et al. ............ 369/44 |
| 4,535,439 | 8/1985 | Satoh et al. ............ 369/32 |
| 4,545,043 | 10/1985 | Anderson et al. ......... 369/32 |
| 4,641,294 | 2/1987 | Yoshimaru .............. 369/32 |

FOREIGN PATENT DOCUMENTS 0046323 2/1982 European Pat. Off. .
0072704 2/1983 European Pat. Off. .
1383105 2/1975 United Kingdom .
2157035 10/1985 United Kingdom .

OTHER PUBLICATIONS

IBM Technical Disclosure Bulletin, vol. 24, No. 1B, Jun. 1981.

Primary Examiner—William M. Shoop, Jr.
Assistant Examiner—Brian Young
Attorney, Agent, or Firm—Nutter, McClennen & Fish

[57] ABSTRACT

A process for writing with updating and reading informations on a non-erasable support organized in sector form. Each sector comprises a synchronization field, a data field, a length field, a type field, an address field and a redundancy field. The data information to be stored and its length are respectively written into the data and length fields. The value written into the type field indicates whether the data information can be updated or not. If updating is possible, the address field receives a pointer designating the free sector of the support, so that said sector is reserved for a possible updating. If updating is not possible, a predetermined value is written in the address field. The error correcting code written in the redundancy field takes account of the contents of the data, length, type and address fields. Writing in all the fields of a sector takes place in a single writing operation.

4 Claims, 3 Drawing Sheets

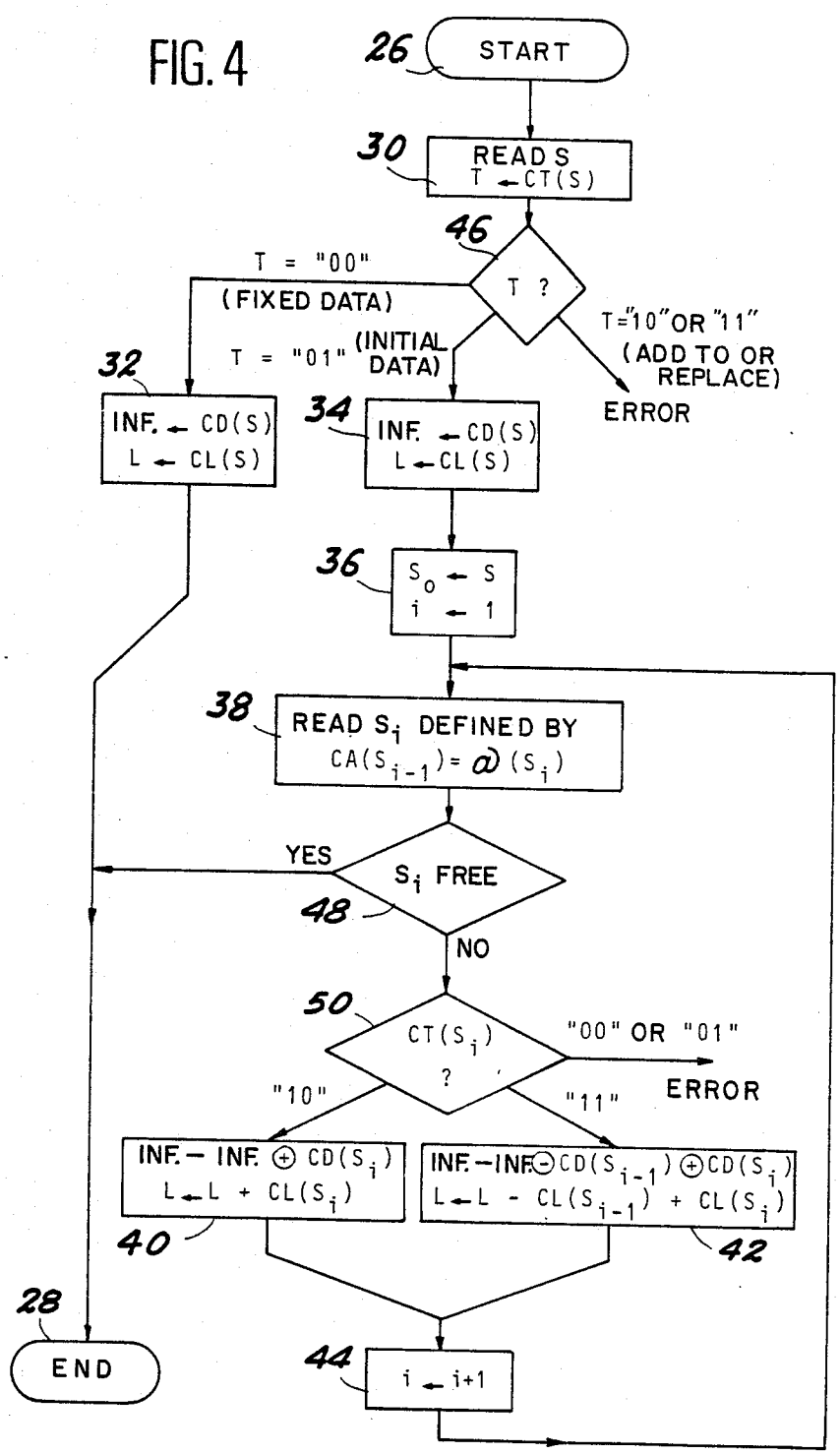

PROCESS FOR WRITING WITH UPDATING AND READING INFORMATIONS ON A NON-ERASABLE SUPPORT ORGANIZED INTO SECTORS

BACKGROUND OF THE INVENTION

The present invention relates to a process for writing with updating and reading of informations on a non-erasable support, medium or carrier organized into sectors. Non-erasable supports are more particularly used for the bulk storage or filing of voluminous informations, because they are not very expensive. These supports are increasingly used in the bulk storage of files and digitized documents.

The digital optical disk constitutes an example of a non-erasable support organized into sectors. On such a support it is possible to write an information at any time on a random sector, but it is not possible to subsequently modify this sector. Such a support is said to be of the WORM type (write once read many, i.e. single writing and multiple reading). These WORM-type supports are very suitable for the bulk storage of data not subject to any changes. However, even in bulk storage or filing applications, it is necessary to keep certain informations up to date, such as lists or indexes permitting access to the filed data.

A commonly accepted solution consists of associating with the non-erasable support, an erasable support in which are stored the informations which can be subject to change. This solution suffers from two major disadvantages. Firstly the loss of informations contained in the erasable support can prevent any access to the informations contained in the non-erasable support and this is the case when the erasable support contains the lists or indexes permitting access to the filed data. Secondly as the non-erasable support can only function with the information contained in the erasable support, said two supports must be permanently associated, e.g. during transportation or storage.

Methods are also known permitting the updating of informations on the actual non-erasable disk. A first method of this type is described in European patent application EP-A1 No. 0 046 323. The main objective of he writing and reading method according to the latter is the provision of an error-free recording on a non-erasable information support organized into sectors. This method consists of writing an information into a sector and then re-reading said information immediately after writing for checking purposes. An address vector is then added to the information to be written into the following sector, so that said address vector indicates that the previously written sector contains a correct information. On re-reading, said address vector ensures that only the correctly written information is transferred to the user. Reference is also made to theproblem of updating the stored information (p 3, line 26 to p 4, line 22).

The method described makes it possible to update small information quantities, such as pointers. However, this method suffers from two major deficiencies, which are, on the one hand, that the new information is recorded to the detriment of the error correcting code, so that the complete sector can soon be made unusable, and on the other hand, said method can only be carried ou at the non-erasable support control unit, i.e. by the designer.

Another method for updating information on a non-erasable support is described in the article "Dynamic data structures on optical disc" by Peter RATHMANN, which appeared in Proceedings of the International Conference on Data Engineering, Los Angeles, Apr. 24/27 1984, pp 174 to 180. A method recommended by the author consists of associating one or more pointers with each recording. When the initial information is written in a sector, the associated pointers are left empty. When it becomes necessary to update the information contained in the sector, the new information is written into a new sector and the pointer of the sector containing the obsolete information is loaded with a value indicating the address of the sector containing the new information and the pointer of the sector associated with the new information is left empty. The same operation is repeated for successive updatings, so that a chained list of sectors is obtained, whereof the first sector contains the most recent information.

The author stresses that the greatest difficulty in this method is that it is necessary to provide an updating pointer. Thus, the non-erasable supports, such as optical discs are designed for the bulk storage of large files and are not very suitable for writing small data quantities at a random point on a sector, which is necessary for updating the pointer. Another problem results from the difficulty of bringing about a correct positioning of the write head. Finally, the writing of small data quantities is not very effective, because it tends to reduce the error correction capacity in the information writen into the sector.

SUMMARY OF THE INVENTION

The object of the invention is to obviate the disadvnatages of the hitherto known methods for updating informations ona non-erasable support. The method according to the invention aims at permitting the recording of a random number of successive modifications without any deterioration to the information.

The process according to the invention consists of adding to the data informations to be stored, a chaining information for logically linking a group of sectors containing initial data informations and the different successive updatings thereof. In this method, the sector is considered to be as being an undividable entity for the writing and reading operations. The informations making it possible to effect the chaining of the sectors is written at the same time as the data informations, which makes it possible to eliminate the difficulties referred to in the above article entitled "Dynamic Data Structure on Optical Disc", due to the fact that the operation of writing a pointer into a sector is separate from the operation of writing data information into sector.

In the method according to invention, the pointer contained in the chaining zone is written at the same time as the data information of the sector with an address value designating a free sector, which could be used for the updating of the data information. However, inorder not to waste the space on the non-erasable support, no free sector is reserved in the case where the data information contained in a sector is declared to be non-modifiable.

More specifically, the present invention relates to a method for writing informations on a non-erasable support organized into sectors, each sector comprising at least one synchronization field, a data field, a length field, an address field and a redundancy field, in which a synchronization code is written into the synchronization field, a data information into the data field and the length of said data information into the length field, wherein there is also a type field in which is written a type code for indicating whether the data information is fixed or can be updated, wherein an address code is written in the address field for designating a free sector is said data information can be updated, so that said free field is reserved for a possible updating of the data information and a predetermined value in the address field if said data information is fixed, writing into all the fields of the sector being carried out by a single writing information, the redundancy code written in the redundancy field taking into account at least the contents of the data, length, type and address fields.

The term redundancy field is understood to mean that in each sector a space is reserved for storing one or more redundancy bits. It is pointed out and is also known to the Expert that these redundancy bits are not necessarily consecutive on the sector, but can be distributed over the entire length thereof, particularly by interlacing with data from the other fields of the sector. This is for example the case when the redundancy bits are produced by a Hamming code applied to the data corresponding to the concatenation of the informations of the data, length, type and address fields.

In a preferred manner, the type code indicating that the data informations can be modified is taken from a predetermined group of codes comprising at least the following codes:

start, which indicates that the sector contains an initial data information, i.e. unmodified, addition, which indicates that the information contained in the current sector must be added to that of the preceding sector, the latter being that whose address code designates said current sector, replacement, which indicates that the information contained in the current sector must replace that of the preceding sector, the latter being that whose address code designated the said current sector.

The invention also relates to a reading method for restoring informations stored on the non-erasable support.

BRIEF DESCRIPTION OF THE DRAWINGS The invention is described in greater detail hereinafter relative to non-limitative embodiments and the reference to the attached drawings, wherein show:

FIG. 1, the breaking down of a non-erasable support sector into several information fields, the writing of informations into the different fields of the same sector taking place, according to the method of the invention, during the same writing operation.

FIG. 2, the chaining of the sectors containing successive updatings of the same initial information.

FIG. 3, a flowchart of the different stages of the writing process according to the invention.

FIG. 4, a flow chart of the different stages of the reading process according to the invention.

DETAILED DESCRIPTION OF THE INVENTION

Figure 1:
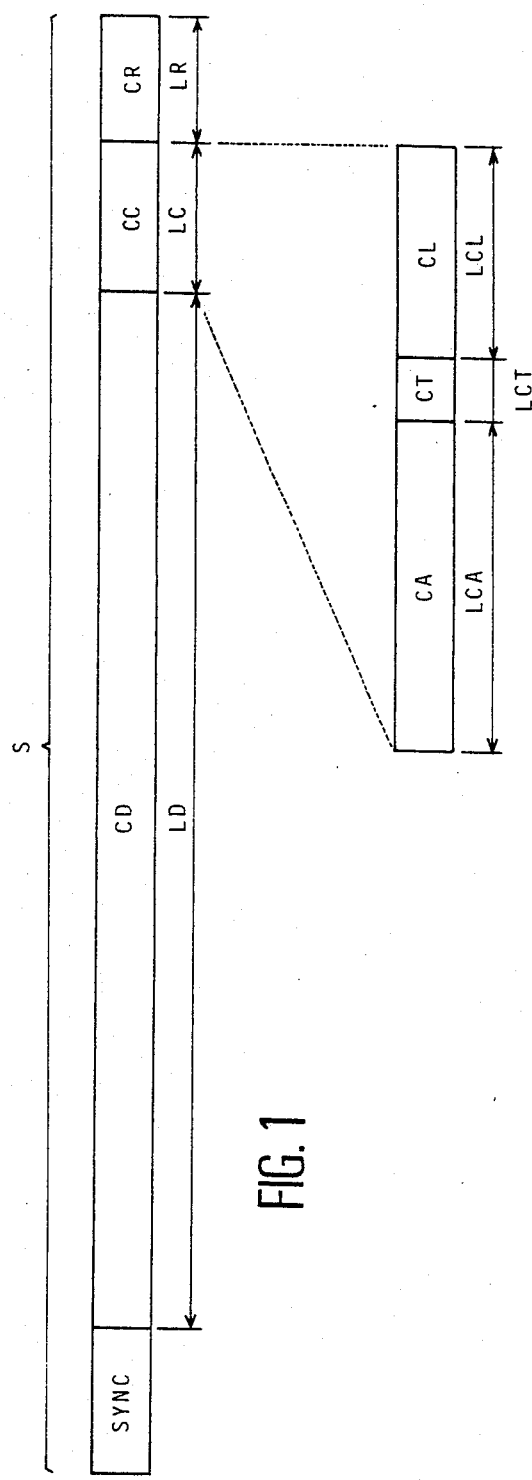

FIG. 1 shows the different informations written in a sector S of a non-erasable support, in the hypothesis that the redundancy bits are consecutive. A similar figure could be established when the redundancy bits are interlaced with at least certain other data of the sector. In this first hypothesis, the informations stored at the head of sector S are synchronization informations SYNC to enable the read-write head of the non-erasable support control means to correctly position itself at the start of the sector for a reading operation. The sector S also has a data field CD, a chaining field CC and a redundancy field CR. The respective lengths of these information fields are designated LD, LC and LR. The redundancy field receives a conventional error correcting code, which takes account of the data contained in the data and chaining fields.

No matter what the distribution of the redundancy bits in the sector, the chaining field CC is broken down into three information fields, namely an address field CA, a type field CT and a length filed CL. These different fields have the respective lengths LCA, LCT and LCL. The address field CA contains a pointer for designating another sector of the non-erasable support. This other sector is used when it is necessary to update also the information contained in the data field CD of the sector S. The type field CT is used for indicating whether the data information contained in the data field CD is liable to be updated. Thus, said data field can contain at least two values, one indicating that the data informations stored in the data field CD cannot be modified and the other indicating that said data can be modified.

Although not strictly necessary, it may be advantageous to provide different type codes as a function of whether the data information contained insector S is an initial information or a subsequent updata of an initial information. In certain applications, the updating operation may solely consist of replacing the obsolete information. A single type code indicating the updating is then adequate. Conversely, in certain other applications, updating can also correspond to the replacement of the obsolete information, or the addition of an information supplementing the initial information. In the latter case, two updating type codes are required.

The last information field of a sector S is the length field CL, which contains a value indicating the length of the data information stored in field CD.

For example, for a sector S having a length of 1024 bytes (not including the synchronization and redundancy informations), the length LD of the data field CD and the length L of the chaining field CC can be respectively regulated to 1020 bytes and four bytes. These four bytes or 32 bits can e.g. be distributed in the following way: 20 bits for the address field, i.e. $2^{20}$ possible sector addresses, 10 bits for the length field CL, i.e. $2^{10}$ bytes, which corresponds to the maximum length of the information contained in the data field CD and two bits for the type field. These two bits make it possible to represent four values corresponding to four sector types: a sector containing an initial information which can be modified, a sector containing an information to be added to a previous information, a sector containing an informationfor replacing a previous information and a sector containing an information which cannot be modified.

Figure 2:
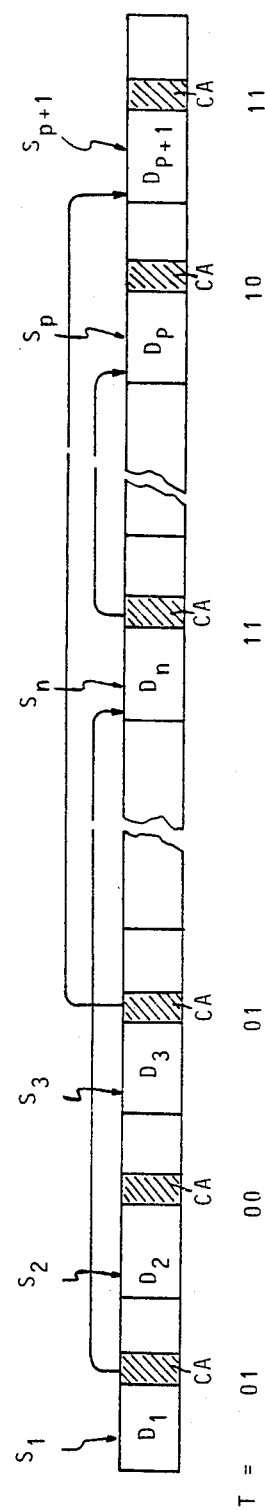

FIG. 2 shows a possible state of a non-erasable support in which the informations $D_1$, $D_2$ and $D_3$ have initially been stored, the data informations $D_1$ and $D_3$ having been subsequently updated. The non-erasable support is constituted by a consecutive sequence of sectors. In the case of a digital optical disc, this sequence of sectors forms a spiral path on the disc surface.

Initially, all the sectors are free. During the first operation of writing on the non-erasable support, the data informations to be stored are written in the order of the free sectors of increasing indexes. Thus, in the example of FIG. 2, sectors $S_1$, $S_2$ and $S_3$ respectively received data informations $D_1$, $D_2$ and $D_3$. The writing of a data information in a sector is accompanied, during the same writing operation, by the writing of the length of said data information in the length field CL of said sector, the type of said information in the type field CT of said sector and the writing of a pointer in the address field CA of said sector.

The data information written in a sector during the first operation of writing on the non-erasable support can be an information liable to updating or a non-modifiable operation. The type code T gives information on the nature of the sector. for example, sectors $S_1$ and $S_3$ of FIG. 2 contain an information which can be updated, whereas sector $S_2$ contains an information which cannot be modified. Type code 00 designates the second case and type code 01 the first case.

The pointer stored in a sector is only useful if the information contained in this sector can be modified. Thus, this value is unimportant in the case where type T has the value 00. A random predetermined value could thus be written in this case into the sector address field. Conversely, when the sector contains an information which can be updated, the pointer is used for designating a free sector in which, if necessary, the updating information could be stored. The designated free sector can simply be the first free sector of the sequence of non-erasable support sectors.

Considering the case where the data information $D_1$ contained in sector $S_1$ becomes obsolete and has to be replaced by another information, this modification of information $D_1$ is possible because the value of type T of sector $S_1$ is equal to 01. The data information $D_n$ for replacing the data information $D_1$ which has become obsolete is written into sector $S_n$ whose address is indicated by the pointer contained in the address field CA of sector $S_1$.

The writing operation on sector $S_n$ is identical to the writing operation on sector $S_1$, i.e. the values of all the fields of the sector are simultaneously written. The data field CD and length field CL respectively receive the information $D_n$ and the length of said information. The address field CA receives a pointer designating a free sector of the non-erasable support. Finally, the type field CT receives a value indicating that the information $D_n$ replaces the inforamtion $D_1$ which has become obsolete. The value of this type code is e.g. 11.

The replacement of one data information by another is a first updating possibility. Another possibility is to complete the data information stored by another data information, the initial data information being retained. For example, as shown in FIG. 2, a data information $D_p$ has completed the data information $D_n$. The writing of complementary data information $D_p$ takes place in sector $S_p$ designated by the pointer contained in the address field of sector $S_n$, whose information is to be completed.

The operation of writing into sector $S_p$ is identical to the writing operation consisting of replacing an obsolete information, the only difference being in the value written into the type field CT. In the case of updating by adding a data information, the value of the type code is e.g. equal to 10.

The number of successive modifications to an initial data information, by replacement or addition, is only limited by the capacity of the non-erasable support. In practice, the informations stored on a non-erasable support undergo few modifications, because otherwise there would be little interset in storing such information on a non-erasable support. Thus, it is merely necessary to provide one of two free sectors for each sector containing an information liable to be updated.

Figure 3:
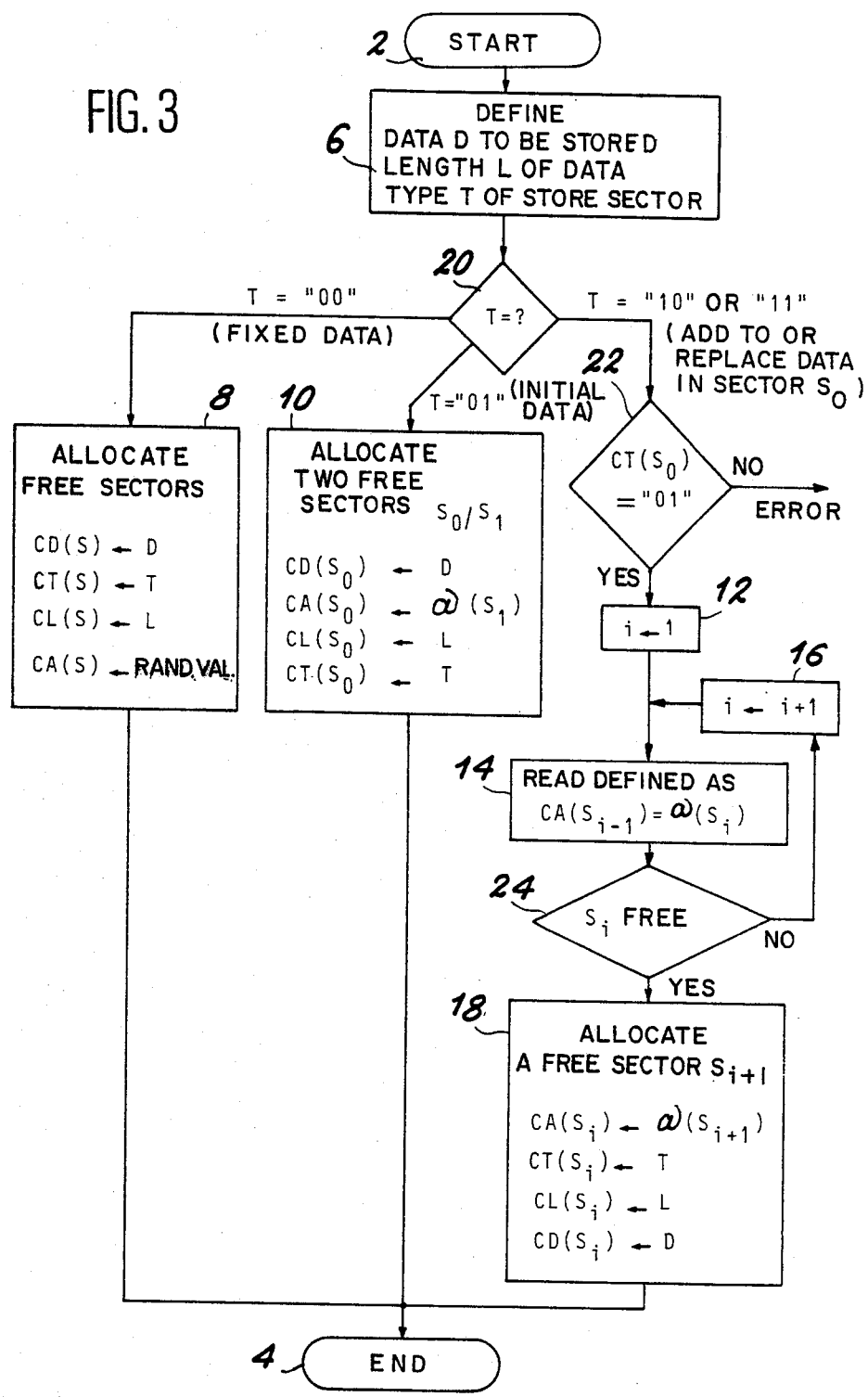

With reference to FIG. 2, the different writing operations which can be performed on the non-erasable support will be described. The characteristics of the different writing operations forming the writing method according to the invention, can be more clearly gathered from reading FIG. 3, which shows a flowchart of this wriing method.

This flowchart comprises operating stages represented by a rectangle with one input andone output and interrogation or testing stages represented by a lozenge with one input and at least two outputs, the different outputs corresponding to the different possible answers to the test. All these stages are included in a startig stage 2 and a finishing stage 4.

The operating stages are as follows:

(a) a stage 4 of defining the data information D to be stored, the length L of said data information and th type T of the sector in which said data information will be stored. These informations are written into a buffer store while awaiting transfer to a non-erasable support sector.

(b) an operation 8 of allocating a free sector S of the non-erasable support and writing in the data, type and length fields of said sector the data D, type T and length L informations. A random value is also written into the address field of sector S.

(c) an operation 10 of allocating two free sectors $S_0$ and $S_1$ and writing in the data, type, length and address fields of sector S0, data, type T, length L and address informations of sector $S_1$.

(d) an operation 12 of initializing a loop index i at value 1.

(e) an operation 14 of reading the content of a sector $S_i$ defined as being the i+1th sector of a chain of sectors commencing by a sector $S_0$ of type 01.

(f) an operation 16 of incrementing the loop index i.

(g) an operation of allocating a free sector $S_{i+1}$ and writing in the data, type and length fields of a sector $S_i$, data D, type T and length L informations and writing in the address field of sector $S_i$ the address of the free sector $S_{i+1}$.

The flow chart also comprises the three following tests:

(a) a test 20 on the value of type T defined in operating stage 6, (b) a test on the type of a sector $S_0$ for which a data information updating is requested, (c) a test 24 on the free or non-free state of a sector $S_i$.

In all cases, the writing process starts with the start stage 2, followed by operation 6 consisting of defining the values to be written into the data, length and type fields of a sector. The process continues with test 20, whichanalyses the value of type T. Three answers are possible, namely T=00 (case of a non-modifiable data information), or T=01 (case of an initial data information which can be updated), or T=10 or 11 (data information modifying an information already stored in a sector).

In the first case (T=00),the process continues by the performance of operation 10. A single sector is allocated and it receives the informations defined in operation 6.

In the second case (T=01), test 20 is followed by operation 10. Two free sectors are allocated, the first for receiving the informations defined in operation 6 and the second designated by the pointer written in the address field of the first sector to permit a possible updating of the data information contained in said first sector.

In the third case (T=10 or 11), the writing process successively comprises test 22, operation 12, operation 14, test 24 and operation 18 if the answer to test 24 is positive or operation 16 and then again operation 15 and test 24 if the answer to test 24 is negative. An updating operation on a data information contained in a sector of the non-erasable support can be an operation of adding a data information (T=10) or an operation of replacing said data (T=11). In both cases, the updating operation relates to a data information contained in a sector of type T=01. The object of test 22 is to check whether this condition is satisfied. If this not the case, an error code is emitted and the updating of the data information cannot be carried out.

If the sector to which the request for updating relates is indeed of type 01, it is necessary to reach the sector containing the most recent update while following the chaining between the initial sector and the final sector. This passing through the chain of sectors is carried out by operations 12, 14 and 16 and test 24. It is apparent that a sector is the last one in a chain when its successor, designated by the pointer contained in the address field of said sector, is a free sector. Operation 10 is then performed to find another free sector $S_{i+1}$ and for writing in sector $S_i$ the data, type and length informations defined in operation 6.

With reference to the flowchart of FIG. 4, a description will now be given of the reading process corresponding to the writing process according to the invention.

This flowchart comprises a group of operations, each represented by a rectangle with one input and one output, as well as a plurality of tests, each represented by a lozenge with one input and several outputs, each output corresponding to a particular answer to the test. There is also a starting stage 26 and a finishing stage 28. The reading operation relates to a sector S of the non-erasable supprt. The flowchart comprises the following operations:

(a) an operation 30 of reading the content of sector S and allocating to a variable T the value of the type field of sector S.

(b) two operations 32, 34 of allocating to a variable INF the value of the data field of sector S and allocating to a variable L the value of the length field of sector S.

(c) an operation 36 of allocating sector S to a variable $S_0$ and initializing to value 1 a loop variable i.

(d) an operation 38 of reading a sector $S_i$ equal to the i+1th sector of a chain of sectors commencing by a sector of type T=01.

(e) an operation 40 of updating the data information INF by adding the information contained in the data field of sector $S_i$ and updating the length L of information INF by adding the value contained in the length field of sector $S_i$ (f) an operation 42 of updating the information INF by eliminating the data information contained in the data field of sector $S_{i-1}$ and by adding the data information contained in the data field of sector $S_i$ and updating the length L of said information INF by subtracting the value contained in the length field of sector $S_{i-1}$ and adding the value contained in the length field of sector $S_i$.

(g) an operation 44 of incrementing the loop index i.

The flowchart also comprises the following tests :

(a) a test 46 on the value of the variable T calculated in operation 30, (b) a test 48 on the state, free or non-free of sector $S_i$ and (c) a test 50 on the value contained in the type field of sector $S_i$.

The reading operation of a sector S is dependent on the value of the type field CT of said sector. This value is determined during operation 30. The test 46 on the value of the type field is then carried out.

If this value is 00, indicating that the sector S contains a data information which cannot be modified, the reading operation is continued by operation 32. The sought data INF is contained in the data field CD of sector S and its length L is equal to the value of the length field CL of sector S. The reading operation is finished.

In the case where the type field contains the value 01, indicating that sector S contains an initial data information which can have been subsequentially updated, the reading operation makes it necessary to pass through the chain of sectors containing the successive updates. This reading starts with operation 34, which allocates the data field of sector S to a variable INF. This variable is stored in a working memory during the reading operation. In the same way, a variable L is defined for indicating the data length of variable INF. This variable L is initialized with the value of the length field CL of sector S.

The following operation is the initialization operation 36 of two loop variables, a variable $S_0$ with sector S and a variable i with value 1.

The successor $S_1$ of the initial sector $S_0$ is then determined by operation 38. The address of this successor is the value contained in the address field CA of sector $S_0$. Test 48 is applied to sector $S_1$ to establish whether or not it is free. If sector $S_1$ is free, i.e. it forms the final sector of the chain of sectors commencing by sector $S_0$, then reading is finished. If sector $S_1$ is not free, it contains an updating information of the data information contained in variable INF.

This data information is normally a data information for replacing (if type T has the value 11) or for adding (if type T has the value 10) to the data informationalready read in the preceding sectors an stored in variable INF. The object of test 50 is to determine the type T of sector $S_1$. The values of the type 00 and 01 are considered as errors.

If the type of sector $S_1$ has the value 10, variables INF adn L are updated by operation 40. The latter consists of adding to the data information already contained in variable INF, the data information contained in the data field CD of sector $S_1$ and adding to value L, the value of the length field CL of sectio $S_1$.

If the type of sector $S_1$ has the value 11, the updating of variables INF and L is carried out in accordance with operation 42. The latter consists of elmininating in variable INF the data information corresponding to the data field CD of sector $S_0$, which is the antecedent of $S_1$ and adding the data information contained in the data field CD of sector $S_1$. The variable L is modified in the same sense.

Following updating of variables INF and L, the loop index i is incremented by operation 44 and the continuous processing by operation 38 for the following sector of the chain.

The operation is repeated until the sector $S_i$ read during operation 38 is free sector and reading is then finished. The variable INF contains the sought data information and its length is equal to L.

I claim:

1. A method for writing information on a non-erasable support organized into sectors, each sector comprising at least one synchronization field, a data field, a length field, an address field and a redundancy field, into which is written a synchronization code into the synchronization field, data information into the data field and length of said data information into the length field, wherein there is also a type field into which is written a type code for indicating whether the data information is fixed or can be updated, wherein an address code is written into the address field for designating a free sector if said data information can be updated, so that said free sector is reserved for a possible updating of the data information and a selected value in the address field if said data information is fixed, writing into all fields of the sector being carried out by a single writing operation, the redundancy code written into the redundancy field function taking into account at least the contents of the data, length, type and address fields.

2. A method of writing information on a non-erasable support organized into sectors, each sector comprising at least one synchronization field, a data field, a length field, an address field and a redundancy field, in which is written a synchronization code into the synchronization field, data information into the data field and the length of said data information into the length field, wherein there is also a type field in which is written a type code for indiaing whethe the data information is fixed or can be updated, said type code indicating that data information can be updated being taken from a group of predetermined codes comprising at least the following codes:

start, which indicates the sector is the first sector written, addition, which indicates that the data information contained in the current sector must be added to that of the preceding sector, the latter being that whose address code designates said current sector, replacement, which indicates that data the information contained in the current sector must replace that of the preceding sector, the latter being that whose address code designates said current sector, wherein an address code is written in the address field for designating a free sector if said data operation can be updated, so that said free field is reserved for a possible updating of the data information and a predetermined value in the address field if said data information is fixed, writing into all the fields of the sector being carried out by a single writing operation, the redundancy code written in the redundancy field taking into account at least the contents of the data, length, type and address fields.

3. A method for writing information on a non-erasable support organized into sectors, each sector comprising at least one synchronization field, a data field, a length field, an address field and a redundancy field, in which a synchronization code is written into the synchronization field, data information into the data field and the length of said data information into the length field, wherein there is also a type field in which is written a type code for indicating whether the data information is fixed or can be updated, wherein an address code is written in the address field for designating a free sector if said data information can be updated, so that said free field is reserved for a possible updating of the data information and a predetermined value in the address field if said data information is fixed, writing into all the fields of the sector being carried out by a single writing operation, the redundancy code written in the redundancy field accommodating at least the contents of the data, length, type and address fields, wherein for restoring a stored data information, a first sector containing initial data information is read, the type of said first sector is determined, the restored information being equal to the data information of said sector if the type corresponds to fixed data information, whereas when the type corresponds to data information which can be updated the restored information is obtained in the following way:

(a) for each sector of the chain of sectors commencing with said first sector, the data information is extracted from said sector and the following sector is determined by the pointer of the address field of said sector, said operation being repeated until the following sector is a free sector, (b) the initial data information is modified by the extracted data informations, each modification (addition or replacement) being determined by the type of sector from which the data information is extracted, the restored data information being equal to the modified initial information.

4. A method according to claim 2, wherein for restoring stored data information, a first sector containing initial data information is read, the type of said first sector is determined, the restored data information being equal to the data information of said sector if the type corresponds to a fixed data information, whereas when the type corresponds to data information which can be updated the restored data information is obtained in the following way:

(a) for each sector of the chain of sectors commencing with said first sector, the data information is extracted from said sector and the following sector is determined by the pointer of the address field of said sector, said operation being repeated until the following sector is a free sector, (b) the initial data information is modified by the extracted data information, each modificaiton (addition or replacement) being determined by the type of sector from which the data information is extracted, the restored data information being equal to the modified initial information.

* * * * *